United States Patent [19]
O'Brien et al.

[11] Patent Number: 6,037,681
[45] Date of Patent: Mar. 14, 2000

[54] ELECTROMAGNETIC TRACTION MOTOR

[75] Inventors: Michael J. O'Brien, Rochester; Robert C. Bryant, Honeoye Falls, both of N.Y.

[73] Assignee: Eastman Kodak Company, Rochester, N.Y.

[21] Appl. No.: 09/181,273

[22] Filed: Oct. 28, 1998

[51] Int. Cl.[7] .............................. H02K 33/12; H02K 7/00
[52] U.S. Cl. ................................................ 310/20; 310/12
[58] Field of Search ................................. 310/20, 37, 80, 310/12

[56] References Cited

U.S. PATENT DOCUMENTS

| | | | |
|---|---|---|---|
| 4,496,865 | 1/1985 | Allen et al. | 310/80 |
| 4,607,197 | 8/1986 | Conrad | 318/115 |
| 5,453,653 | 9/1995 | Zumeris | 310/323 |
| 5,616,980 | 4/1997 | Zumeris | 310/323 |
| 5,731,640 | 3/1998 | Dietrich et al. | 310/12 |

*Primary Examiner*—Nestor Ramirez
*Assistant Examiner*—Judson H. Jones
*Attorney, Agent, or Firm*—Thomas H. Close

[57] ABSTRACT

An electromagnetic traction motor is used to impart a linear motion on a movable member. A contact plate is mounted to a slide of the movable member. The contact plate has a surface which is in mechanical contact with the electromagnetic traction motor which is preloaded against the surface of the contact plate. The electromagnetic traction motor has a center body part with a triangular shaped portion. The triangular shaped portion forms a bearing surface. Below the bearing surface a deformable structure is established. A deformation of the deformable structure is initiated by at least two electromagnetic coils, which are energized in an specific manner.

12 Claims, 6 Drawing Sheets

ELECTROMAGNETIC TRACTION MOTOR

FIELD OF THE INVENTION

The invention relates to an electromagnetic traction motor.

BACKGROUND OF THE INVENTION

There are numerous suggestions in the prior art which are used to transfer a rotational motion of an electric motor into a linear motion of an attached actuation device. Some of the prior art documents are listed below:

The document JP-A-58-192451 discloses a linear actuator having a reduced inertial moment. A stepping motor is mounted on a base, with which shaft supporting pieces are provided integrally on both sides. The motor has ring shaped stators, and a ring shaped rotor magnet. A cam unit is formed at a rotary disk which supports the magnet. When the coils provided on the stators are energized, the magnet and the disk are rotated, with the result that the cam unit formed on the disk is rotated. Thus, a pin moves along the groove of the cam unit, a head frame which is engaged with the cam unit through the pin moves on a shaft and slides on a magnetic disc.

As disclosed in Allen et al., U.S. Pat. No. 4,496,865, issued Jan. 29, 1985, entitled "Methods and Apparatus For Translating Electric Motor Rotation Into Linear Travel", the rotational motion of the electric motor is translated into a linear motion by a linearly traveling device. This linearly traveling device is restrained against rotation at points peripherally distributed relative to the device. In particular there is a pair of interfitting parts including a linear keyplate and a keyway at each of the peripheral distributed points. One of these interfitting parts is connected to the linearly travelling device and the other of these parts is maintained stationary relative to that one interfitting part.

As disclosed in Conrad, U.S. Pat. No. 4,607,197, issued Aug. 19, 1986, entitled "Linear and Rotary Actuator", a cylindrical movable member or armature is provided which is mounted for both axial movement and for angular movement about its axis. The armature member has teeth on its surface formed in both axial rows and in circumferential alignment or rows. Stator means having poles with windings associated with the poles is provided, the stator means having a central opening in which the movable armature member is mounted for angular and axial movement. By energizing certain angularly spaced windings, the movable armature member may be caused to rotate. By energizing certain axially spaced windings, the movable member of the armature can be caused to move axially. Simultaneous angular and axial movement is achieved by energizing appropriate windings.

As disclosed in Dietrich et al., U.S. Pat. No. 5,731,640, issued Mar. 24, 1998, entitled "Converter for Changing Rotary Movement to Axial Movement", the device has a spindle, a spindle nut surrounding the spindle, and a plurality of rollers. Each of the rollers has a groove profile corresponding to a thread in the spindle and roller grooves corresponding to spindle grooves formed on the interior of the spindle nut. The converter device is driven by a drive unit such as an electric motor, either via the elements spindle nut and spindle or, with an interposed connection element, via the rolling elements or rollers. The converter device has a reset device with a mechanical energy accumulator and an energy delimiter. Energy transfer takes place from the electric motor via the energy delimiter to energy accumulator connected to a casing or vice versa.

Another approach for providing a mechanism which imparts a motion to a moving body is disclosed in the patents by Zumeris: U.S. Pat. No. 5,453,653, issued Sep. 26, 1995, entitled "Ceramic Motor," and U.S. Pat. No. 5,616,980, issued Apr. 1, 1997, entitled "Ceramic Motor". Both patents disclose a ceramic micromotor for moving a body. The ceramic motor comprises a piezoelectric plate to which electrodes are attached. Additionally a ceramic spacer is mounted to the piezoelectric plate and in operation, the spacer is pressed against the moving body. Spring loading is provided to reduce the effects of wear and to provide a degree of shock protection for the piezoelectric ceramic. In a preferred embodiment spring loaded supports are applied in order to provide pressure between the ceramic spacer and the moving body which causes the motion of the ceramic spacer to be transmitted to the moving body. A conversion circuitry is necessary to drive the ceramic motor.

The drawback of the devices as disclosed in U.S. Pat. No. 5,453,653 and U.S. Pat. No. 5,616,980, is that the ceramic structure which provides the mechanical motion, needs to be driven by an electric circuit which applies voltages in the range between 30 and 500 volts AC. Therefore the use of the ceramic motors in battery powered devices require an additional conversion circuitry for providing the required voltage.

SUMMARY OF THE INVENTION

The problem to be solved by the present invention is to provide an electromagnetic traction motor, which is capable of being operated at voltages typically associated with chemical cell batteries.

The above object is accomplished by an electromagnetic traction motor comprising:

a) a center body part having a base portion and a triangular shaped portion defined by first and a second members angled against each other and forming a bearing surface;

b) a deformable structure formed below said bearing surface; and c) at least two elements are held in intimate contact with said base portion and spaced from said deformable structures, and each of said elements bearing an electromagnetic coil.

ADVANTAGEOUS EFFECT

It is one advantage of the inventive electromagnetic traction motor, that it can be used in a battery powered device without the need of a conversion circuitry. An additional advantage is that the electromagnetic traction motor is preloaded against the movable member. This kind of mounting is very simple since no springs or other mechanical load applying means are necessary.

These together with other objects and advantages which will be subsequently apparent, reside in the details of construction and operation as more fully hereinafter described and claimed, reference being made to the accompanying drawings forming a part hereof, wherein like numerals refer to like parts throughout.

DETAILED DESCRIPTION OF THE INVENTION

Figure 1:
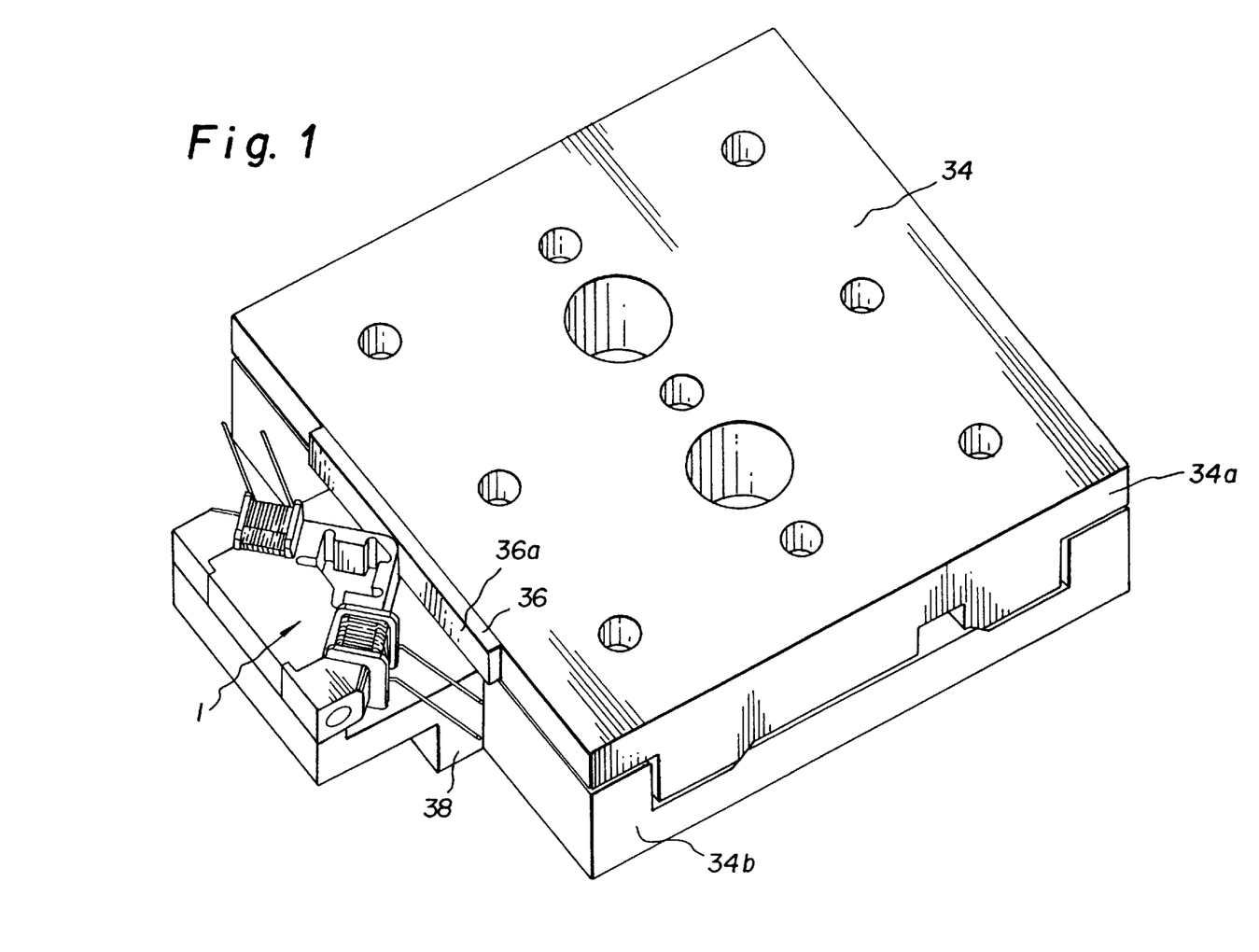
FIG. 1 illustrates a three dimensional view of one embodiment of an electromagnetic traction motor being in contact with a movable member.

An electromagnetic traction motor 1 is used to impart a linear motion on a movable member 34. It is clear for a skilled person that the inventive electromagnetic traction motor 1 can also be used to impart a rotational motion on a movable member. In order achieve a rotation, the movable member 34 has to be supported for rotation. An embodiment for a movable member 34 with the restriction to a linear motion is shown in FIG. 1. The electromagnetic traction motor 1 engages the movable member 34. In this embodiment the movable member 34 is a slide 34a which is restricted to a linear movement by a guide 34b. A contact plate 36 is mounted to the slide 34a of the movable member 34. The contact plate 36 has a surface 36a, which is in mechanical contact with the electromagnetic traction motor 1. The contact plate 36 can be omitted if there is a material match between the slide 34a and the electromagnetic traction motor 1. The guide 34b of the movable member 34 is provided with a stage 38 to which the electromagnetic traction motor 1 is attached such that a preloaded mechanical contact between the electromagnetic traction motor 1 and the surface 36a of the contact plate 36 is established.

Figure 2:
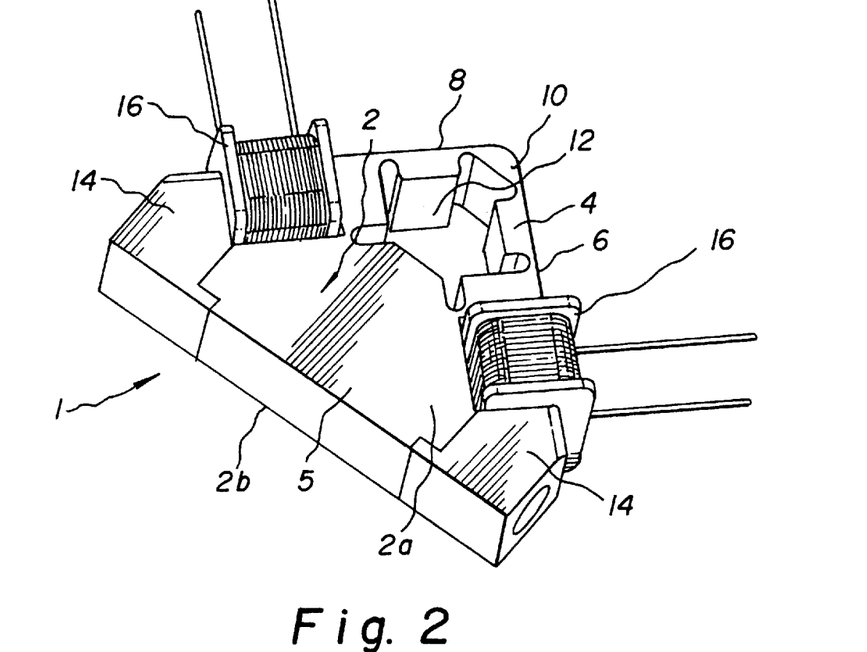
FIG. 2 illustrates a three dimensional view of the electromagnetic traction motor shown in FIG. 1.

A three dimensional view of the electromagnetic traction motor 1 is displayed in FIG. 2. The electromagnetic traction motor 1 comprises a center body part 2 which has a base portion 5 and a triangular shaped portion 4. The center body part 2 is substantially flat and having an upper and a lower surface 2a and 2b which are parallel to each other. The triangular shaped portion 4 is defined by a first and a second member 6 and 8. The first and second member 6 and 8 are angled against each other. The intersection of the first and the second member 6 and 8 forms a bearing surface 10. The bearing surface 10 has for example, the form of a rounded tip. Additionally, the triangular portion 4 has a deformable structure 12 formed below the bearing surface 10. An element 14 bearing an electromagnetic coil $16_1$ and $16_2$ respectively, held in intimate contact with the base portion 5 of the center body 2. One element 14 is mounted on either side of the base portion 5. The electromagnetic coils $16_1$, $16_2$ are energized by an electronic circuit means (not shown). Additionally the elements 14 are mounted to the base portion in a way they are spaced from the deformable structure 12.

Figure 3:
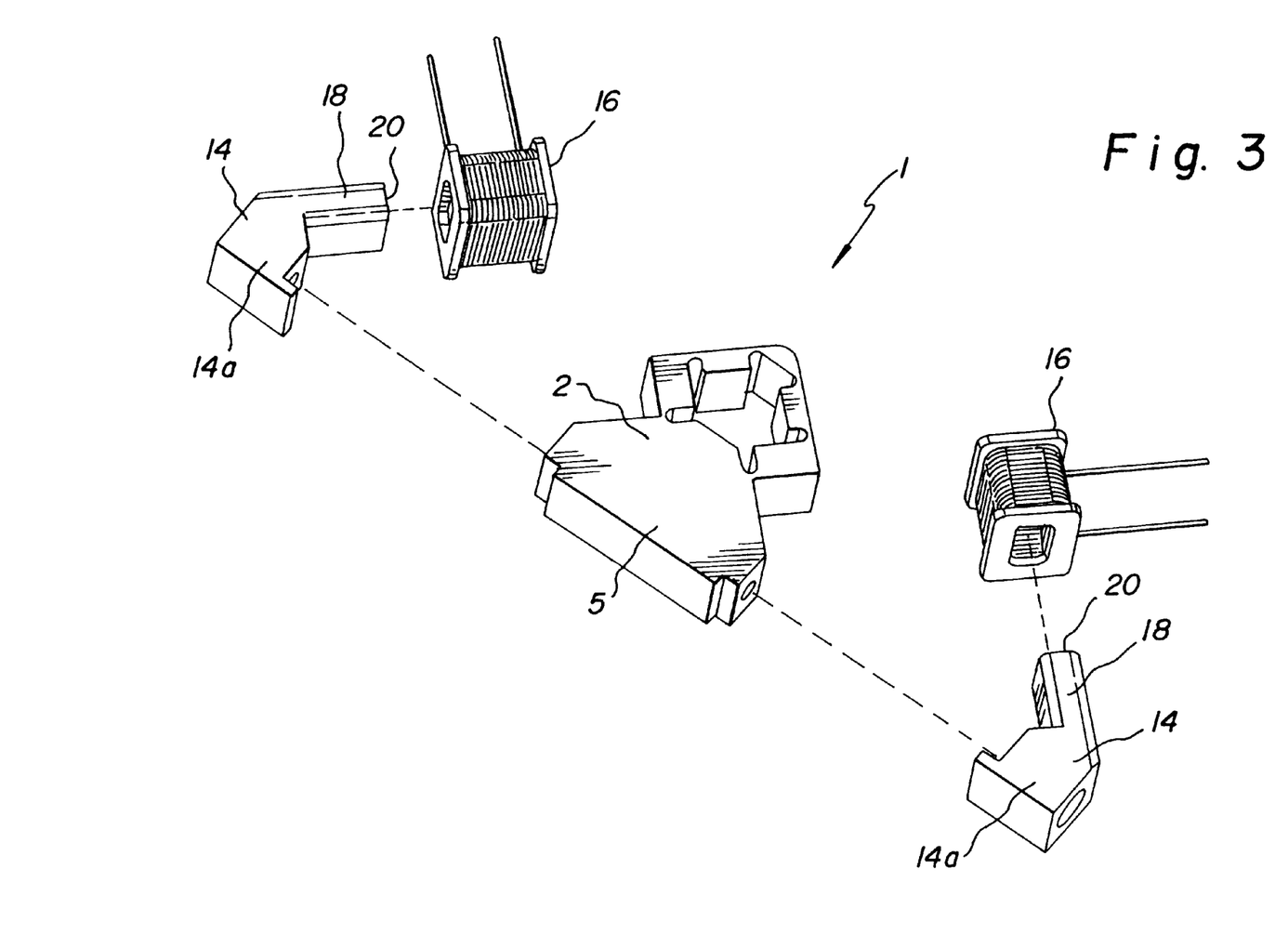
FIG. 3 illustrates an exploded view of a first embodiment of the electromagnetic traction motor.
Figure 4:
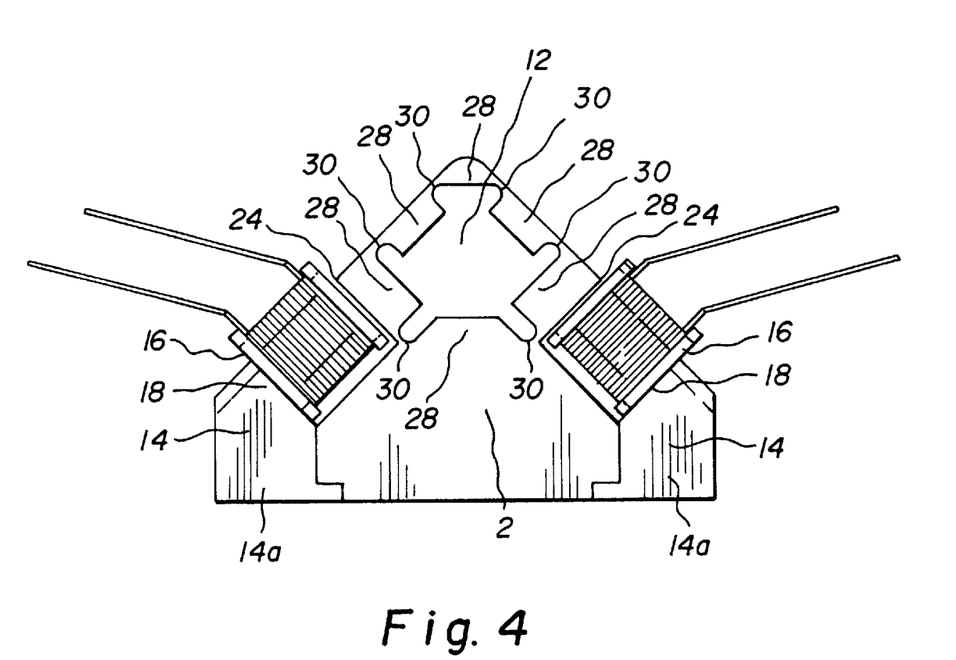
FIG. 4 is a two dimensional view of the electromagnetic traction motor shown in FIG. 3.

FIG. 3 shows an exploded view of the inventive electromagnetic traction motor 1. The elements 14 are separated from the central body part 2. The elements have a base 14a and an elongated portion 18. The base 14a of the elements 14 is in intimate contact with the base portion 5 of the center body part 2 when the elements 14 are attached to the center body part 2. The elongated portion 18 of each of the elements 14 carries the electromagnetic coil $16_1$ and $16_2$ respectively. Each elongated portion 18 defines a free end 20 and acts as the core of the electromagnetic coils 16. A two dimensional view of the embodiment of the electromagnetic traction motor 1 as disclosed in FIG. 3 is shown in FIG. 4. Each elongated portion 18 of the elements 14 forms a gap 24 between the free end 20 and the center body part 2. The gap 24 is present when the electromagnetic coils $16_1$ and $16_2$ on the elements 14 are not energized. Additionally, the gap 24 is necessary to allow a deformation of the deformable structure 12. The deformable structure 12 itself is an arrangement of rigid sections 28 interconnected by flexural hinges 30. The flexural hinges 30 are formed by thinned wall sections of the center body part 2. In the present invention the deformable structure 12 is created by a cut-out from the triangular shaped portion 4. As being apparent from FIG. 4, the flexural hinges 30 are formed by cuts from the cut-out into the direction of the walls of the center body part 2. The deformable structure 12 as shown in the present invention is not regarded as a limitation. For example, the cut-out can be filled with a resilient material, such as natural rubber or any other elastomer. Additionally the form of the cut-out is not limited to the form as shown in the drawings.

Figure 5:
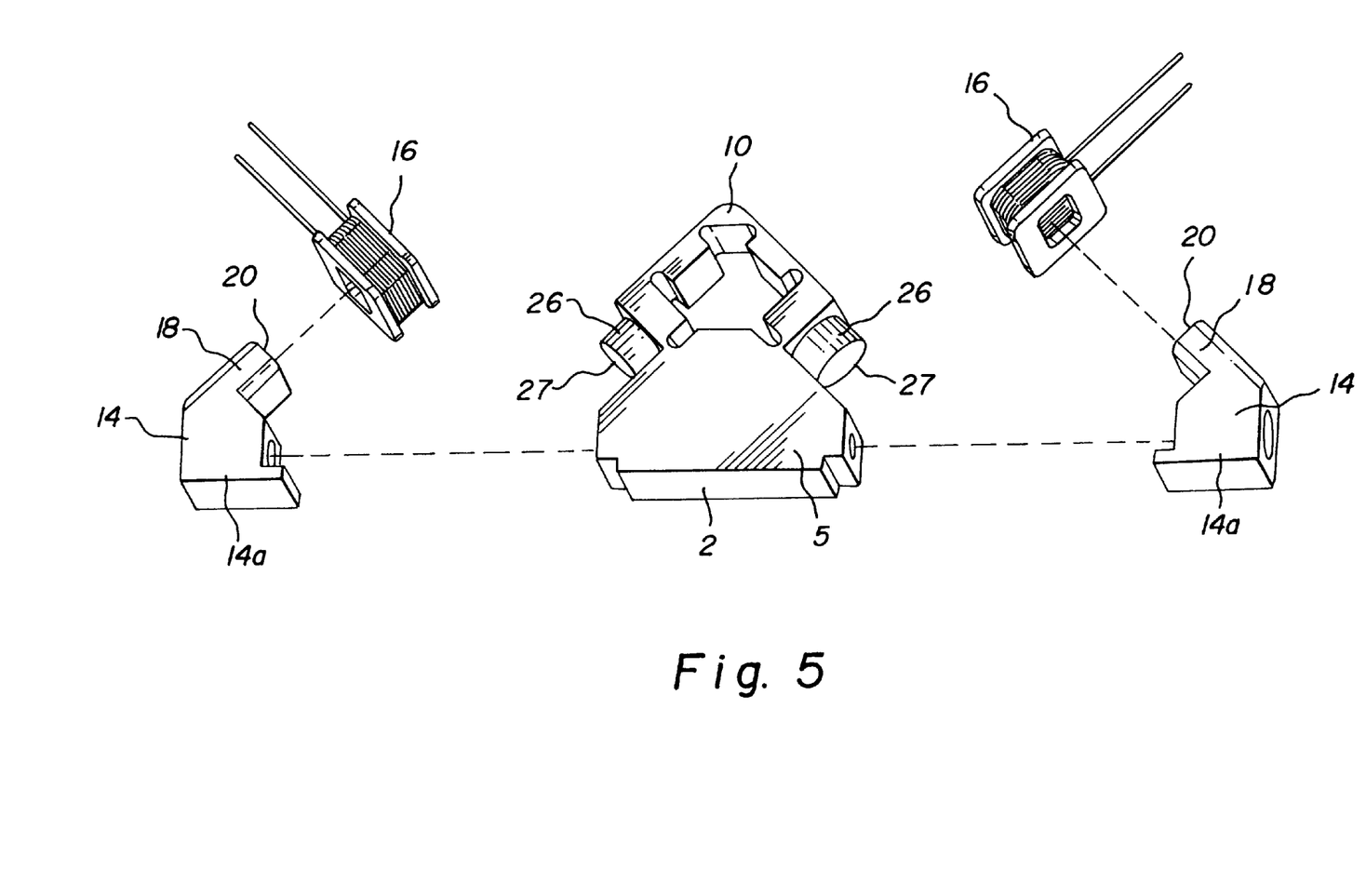
FIG. 5 illustrates a second embodiment of the electromagnetic traction motor in an exploded view.

FIG. 5 shows a second embodiment: the electromagnetic traction motor 1. The elements 14 are separated from the central body part 2. The elements have a base 14a and an elongated portion 18. In the mounted state, the base 14a of the elements 14 is in intimate contact with the base portion 5 of the center body part 2. The elongated portion 18 of the elements 14 carries the electromagnetic coil $16_1$ and $16_2$ respectively. Each elongated portion 18 defines a free end 20. Adjacent the free end 20 of the elongated portion 18 a permanent magnet 26 is mounted to the center body part 2. Each permanent magnet 26 has a free end 27, which opposes in the mounted state of the elements 14 the free end 20 of the elements 14. As already shown in FIG. 4, each elongated portion 18 of the elements 14 forms a gap 24 between the free end 20 and the center body part 2. In contrast hereto, the embodiment shown in FIG. 5 forms a gap 24 (see FIG. 7) between each free end 20 of the elements 14 and each free end 27 of the permanent magnets 26. The gap 24 is present when the electromagnetic coils $16_1$ and $16_2$ on the elements 14 are energized in a way that the electromagnetic attraction force generated by the electromagnetic coils $16_1$ and $16_2$ compensates the attraction force of the permanent magnets 26. Additionally, the gap 24 is necessary to allow a deformation of the deformable structure 12 below the bearing surface 10.

Figure 6:
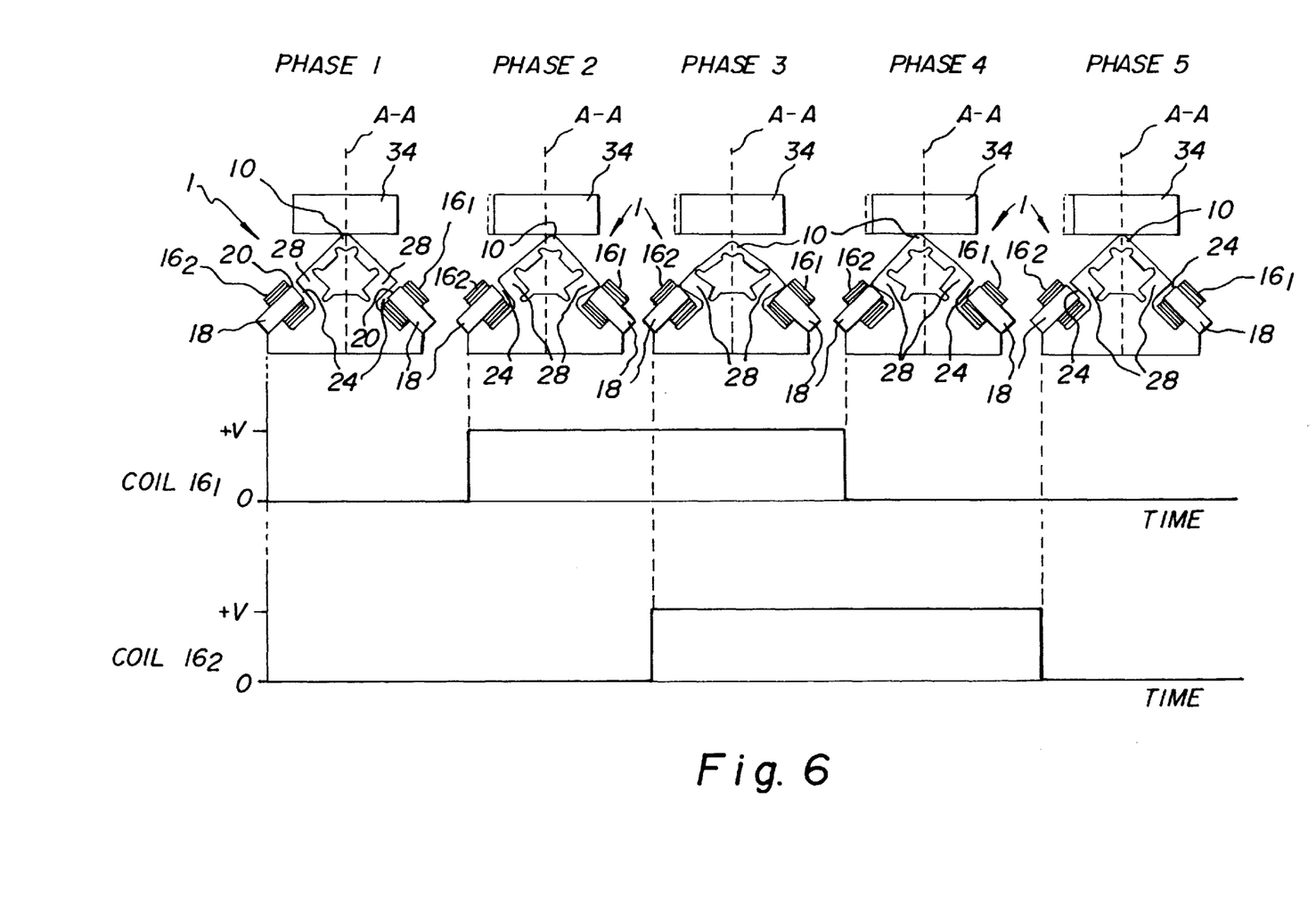
FIG. 6 illustrates the motion of the bearing surface of a first embodiment of the electromagnetic traction motor, wherein the motion is initiated by a sequence of driving pulses applied to the electromagnetic coils of the electromagnetic traction motor.

For the first embodiment (shown in FIGS. 1–4), the deformation of the deformable structure 12 and the motion movable member 34 are shown in FIG. 6. Five phases display one motion cycle of the deformable structure 12. In addition to the motion of the electromagnetic traction motor 1, the voltage applied to the windings of the electromagnetic coils $16_1$ and $16_2$ is shown below each stage. The center of the electromagnetic traction motor 1 is marked with a center axis A-A.

Phase 1

The bearing surface 10 of the electromagnetic traction motor 1 is preloaded against the movable member 34. Here the contact plate 36 (FIG. 1) is omitted because of a material match between the bearing surface 10 and the movable member 34. It is preferred that the material of the bearing surface 10 is made of a hard material with low wear properties. Materials, which fulfill the requirement, are ceramics such as alumina or hardened steel. A first electromagnetic coil $16_1$ is located on the right of the center axis A-A and a second electromagnetic coil $16_2$ is located on the left of the center axis A-A. No voltage is applied to the windings of both electromagnetic coils $16_1$ and $16_2$ (see voltage diagram below phase 1). The movable member 34 is in its initial position and the bearing surface 10 is preloaded against the movable member 34.

Phase 2

Now, a voltage with a positive level is applied to the winding of the first electromagnetic coil $16_1$ and no voltage is applied to the winding of the second electromagnetic coil $16_2$ (see voltage diagram below phase 2). This voltage switch in the first electromagnetic coil $16_1$ causes an attraction of the rigid element 28 to the free end 20 of the elongated member 18 bearing the first electromagnetic coil $16_1$. The gap 24 between the free end 20 and the center body part 2 is closed. The deformable structure 12 of the electromagnetic traction motor 1 is deformed in a way that the bearing surface 10 moves to the right of the center axis A-A. Since the bearing surface 10 is preloaded against the movable member 34, a motion of the movable member 34 to the right of the center axis A-A is imparted by the rounded tip 10.

Phase 3

A voltage with a positive level is applied to the winding of the second electromagnetic coil $16_2$, in addition to that, the first electromagnetic coil $16_1$ remains on the positive voltage level (see voltage diagram of phase 3). This voltage switch in the second electromagnetic coil $16_2$ causes an attraction of the rigid element 28 to the free end 20 of the elongated member 18 bearing the second electromagnetic coil $16_2$. The gap 24 between the free end 20 and the center body part 2 is closed. The deformable structure 12 of the electromagnetic traction motor 1 is deformed in a way that the bearing surface 10 is pulled away from the movable member 34. The bearing surface 10 is no longer in contact with the movable member 34. No motion is imparted on the movable member 34 during this phase.

Phase 4

The voltage applied to the winding of the first electromagnetic coil $16_1$ is switched off (see voltage diagram of phase 4). The voltage applied to the winding of the second electromagnetic coil $16_2$ remains on. This voltage switch in the first electromagnetic coil $16_1$ causes a release of the rigid element 28 from the free end 20 of the elongated member 18 bearing the first electromagnetic coil $16_1$. The gap 24 between the free end 20 and the center body part 2 is present again. The deformable structure 12 of the electromagnetic traction motor 1 is deformed in a way that the bearing surface 10 is brought again into contact with the movable member 34. The contact of the bearing surface 10 with the movable member 36 is to the left of the center axis A-A.

Phase 5

The voltage applied to the winding of the second electromagnetic coil $16_2$ is switched off (see voltage diagram below phase 5). Now there is no voltage applied to the first and the second electromagnetic coil $16_1$ and $16_2$. Due to the resilient properties of the deformable structure 12 of the electromagnetic traction motor 1 the bearing surface 10 is moved back to the initial position (see phase 1). Since the bearing surface 10 is preloaded against the movable member 34, the motion of the bearing surface 10 causes a further motion of the movable member 34 to the right of the center axis A-A.

Figure 7:
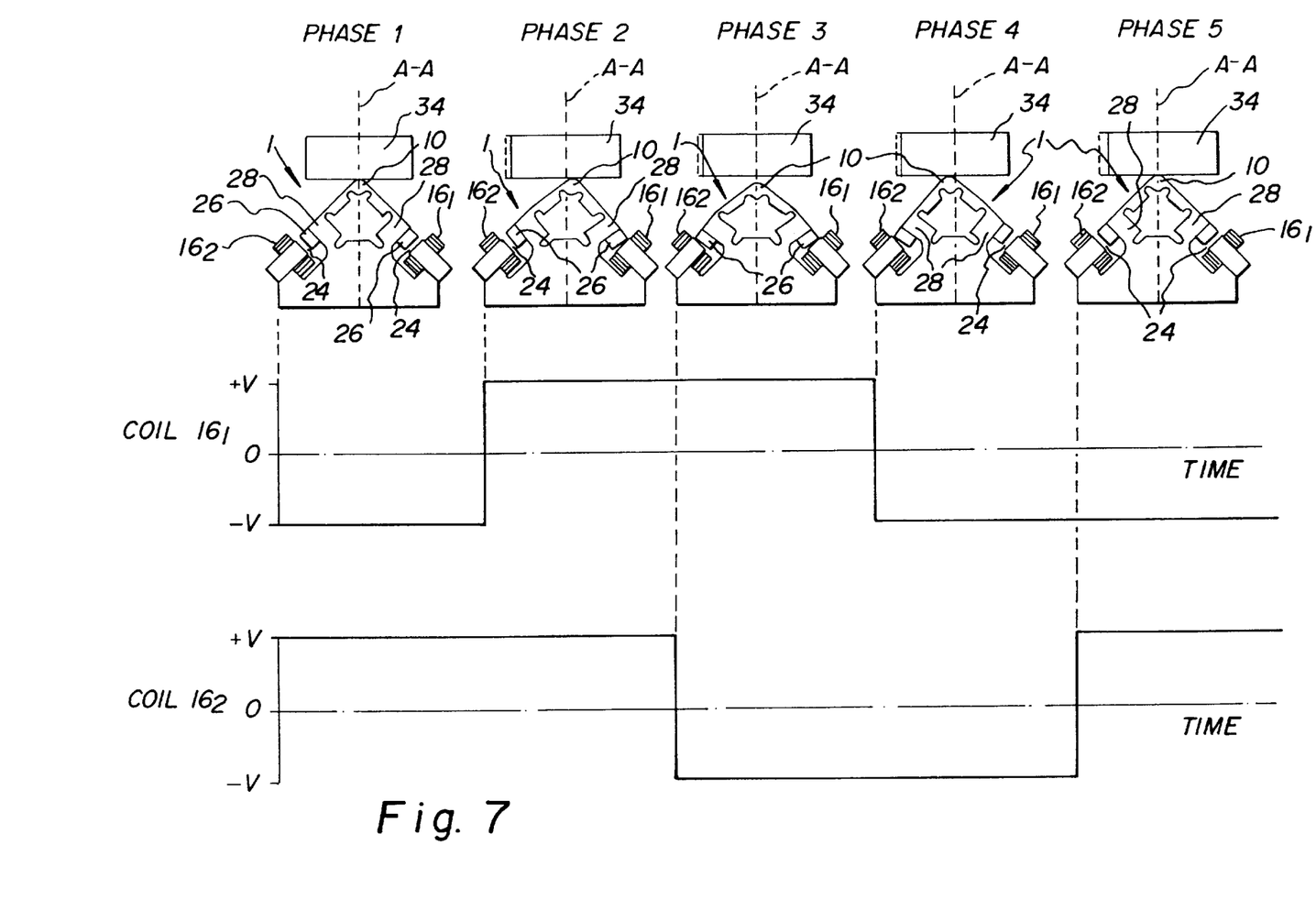
FIG. 7 illustrates the motion of the bearing surface of a second embodiment of the electromagnetic traction motor, wherein the motion is initiated by a sequence of driving pulses applied to the electromagnetic coils of the electromagnetic traction motor.

For the second embodiment (FIG. 5), the deformation of the deformable structure 12 and the motion movable member 34 is shown in FIG. 7. Five phases display one motion cycle of the deformable structure 12. In addition to the motion of the electromagnetic traction motor 1 the voltage applied to the windings of the electromagnetic coils $16_1$ and $16_2$ is shown below each stage. The center of the electromagnetic traction motor 1 is marked with a center axis A-A.

Phase 1

As mentioned above, the bearing surface 10 of the electromagnetic traction motor 1 is preloaded against movable member 34. The first electromagnetic coil $16_1$ is located on the right of the center axis A-A and the second electromagnetic coil $16_2$ is located on the left of the center axis A-A. A negative voltage is applied to the winding of the first electromagnetic coil $16_1$ and a positive voltage is applied to the winding of the second electromagnetic coil $16_2$ (see voltage diagram below phase 1). The voltages are necessary to compensate the opposite attraction forces of the permanent magnets 26 mounted on the center body 2. The movable member 34 is in its initial position and the bearing surface 10 is centered with respect to the central axis A-A. The gap 24 between the free end 27 of the permanent magnet 26 and the free end 20 of the elongated member 18 is open.

Phase 2

Now the winding of the first electromagnetic coil $16_1$ is switched form the negative voltage level to a positive voltage level. The voltage applied to the winding of the second electromagnetic coil $16_2$ remains on the positive level (see voltage diagram below phase 2). This voltage switch in the first electromagnetic coil $16_1$ causes a movement of the permanent magnet 26 in direction of the free end 20 of the elongated member 18 bearing the first electromagnetic coil $16_1$. The deformable structure 12 of the electromagnetic traction motor 1 is deformed in a way that the bearing surface 10 moves to the right of the center axis A-A. Since the bearing surface 10 is preloaded against the movable member 34, a motion of the movable member 34 to the right of the center axis A-A is imparted.

Phase 3

Now the voltage applied to the winding of the second electromagnetic coil $16_2$ is switched form positive level to the negative level. The voltage applied to the first electromagnetic coil $16_1$ remains on the positive level (see voltage diagram below phase 3). This voltage switch in the second electromagnetic coil $16_2$ causes a movement of the permanent magnet 26 in direction of the free end 20 of the elongated member 18 bearing the second electromagnetic coil $16_2$. The deformable structure 12 of the electromagnetic traction motor 1 is deformed in a way that the bearing surface 10 is pulled away from the movable member 34. The bearing surface 10 is no longer in contact with the movable member 34. No motion is imparted on the movable member 34 in this phase.

Phase 4

The voltage applied to the winding of the first electromagnetic coil $16_1$ is switched to the negative voltage level. The voltage applied to the second electromagnetic coil remains $16_2$ on the negative level (see voltage diagram below phase 4). This voltage switch in the first electromagnetic coil $16_1$ causes a release of the permanent magnet 26 from the free end 20 of the elongated member 18 bearing the first electromagnetic coil $16_1$. The deformable structure 12 of the electromagnetic traction motor 1 is deformed in a way that the bearing surface 10 is brought again into contact with the movable member 34. The contact of the bearing surface 10 with the movable member 36 is to the left of the center axis A-A.

Phase 5

The voltage applied to the winding of the second electromagnetic coil $16_2$ is switched again to the positive level and the voltage applied to the winding of the first electromagnetic coil $16_1$ remains on the negative level (see voltage diagram below phase 5). This voltage switch in the second electromagnetic coil $16_2$ causes a release of the permanent magnet 26 from the free end 20 of the elongated member 18 bearing the second electromagnetic coil $16_2$. Due to the resilient properties of the deformable structure 12 of the electromagnetic traction motor 1 the bearing surface 10 moves back to the initial position (see phase 1). Since the bearing surface 10 is preloaded against the movable member 34, the motion of the bearing surface 10 causes a further motion of the movable member 34 to the right of the center axis A-A.

The invention has been described in detail with particular reference to certain preferred embodiments thereof, but it will be understood that variations and modifications can be effected within the spirit and scope of the invention.

PARTS LIST 1 electromagnetic traction motor
2 center body part
2a upper surface of the center body part
2b lower surface of the center body part
4 triangular shaped portion
5 base portion
6 first member
8 second member
10 bearing surface
12 deformable structure
14 element
14a base of element
16 electromagnetic coil
$16_1$ first electromagnetic coil
$16_2$ second electromagnetic coil
18 elongated portion
20 free end of the element
24 gap
26 permanent magnet
27 free end of permanent magnet
28 rigid section
30 flexural hinge
32 thinned wall section
34 movable member
34a slide
34b guide
36 contact plate
36a surface
38 stage
A-A center axis

What is claimed is:

1. An electromagnetic traction motor comprising;
   a) a center body part having a base portion and a triangular shaped portion defined by first and a second members angled against each other and forming a bearing surface;
   b) a deformable structure formed below said bearing surface; and
   c) at least two elements are held in intimate contact with said base portion and spaced from said deformable structure and each of said elements bearing an electromagnetic coil.

2. The electromagnetic traction motor as recited in claim 1 wherein said elements having an elongated portion defining a free end and forming a core for the electromagnetic coil, and a gap is formed between each of said free ends of said elongated portion and said center body part.

3. The electromagnetic traction motor as recited in claim 2 wherein a permanent magnet mounted to the center body part opposite each free end of said elongated portions of said elements, said permanent magnet defines a free end, and a gap is defined between the free end of the permanent magnet and the free end of the elongated portion of said element.

4. The electromagnetic traction motor as recited in claim 1 wherein the deformable structure is an arrangement of rigid sections interconnected by flexural hinges.

5. The electromagnetic traction motor as recited in claim 4 wherein the flexural hinges are formed by thinned wall sections of the center body part.

6. The electromagnetic traction motor as recited in claim 1 wherein the bearing surface is preloaded against a surface on a movable member.

7. The electromagnetic traction motor as recited in claim 1 wherein the bearing surface is made of a hard material of low wear properties.

8. The electromagnetic traction motor as recited in claim 7 wherein the bearing surface is made of ceramic such as alumina.

9. The electromagnetic traction motor as recited in claim 7 wherein the bearing surface is made of hardened steel.

10. The electromagnetic traction motor as recited in claim 1 wherein the bearing surface has the shape of a rounded tip.

11. The electromagnetic traction motor as recited in claim 1 wherein the electromagnetic coils are energized by a square wave voltage.

12. The electromagnetic traction motor as recited in claim 11 wherein the square wave voltage applied to the first electromagnetic coil has a 90° phase shift with respect to the square wave voltage applied to the second electromagnetic coil.

* * * * *